Feb. 13, 1962                M. E. SIMMONS ET AL                3,021,444
                            DYNAMO ELECTRIC MACHINE
Filed June 6, 1957                                              2 Sheets-Sheet 1
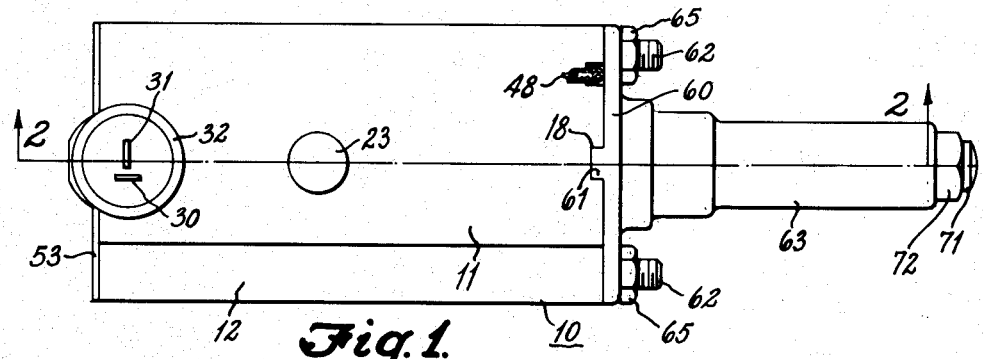
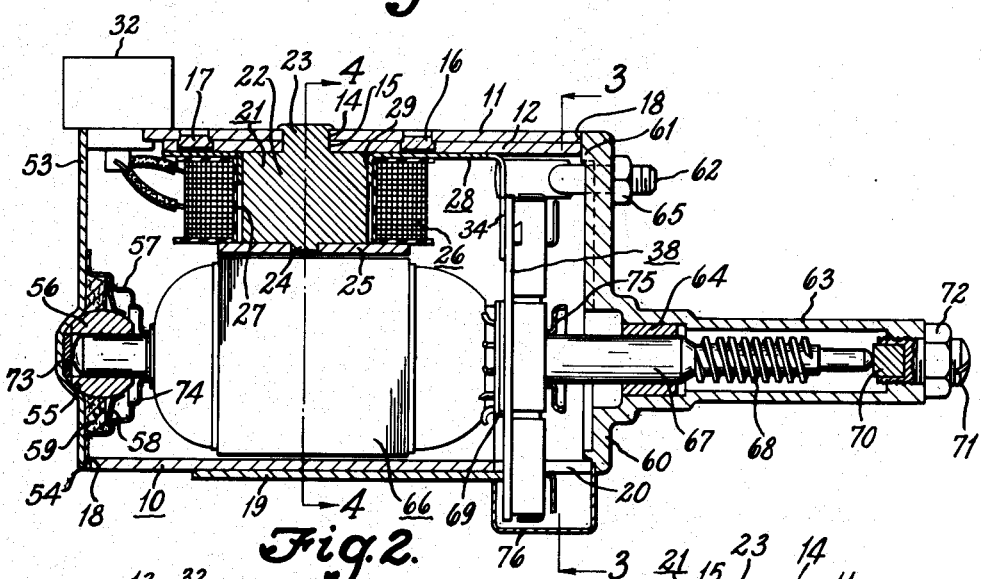
INVENTORS
MILTON E. SIMMONS
BY CARL J. FINSTERWALDER
FRANK J. TERKOSKI
M.H. Strickland
ATTORNEY INVENTORS
MILTON E. SIMMONS
BY CARL J. FINSTERWALDER
FRANK J TERKOSKI
M. H. Strickland
ATTORNEY …

United States Patent Office 3,021,444
Patented Feb. 13, 1962

3,021,444
DYNAMO ELECTRIC MACHINE
Milton E. Simmons, Carl J. Finsterwalder, and Frank J. Terkoski, Rochester, N.Y., assignors to General Motors Corporation, Detroit, Mich., a corporation of Delaware
Filed June 6, 1957, Ser. No. 664,009
10 Claims. (Cl. 310—259)

This invention pertains to dynamo electric machines, and particularly to small direct current electric motors.

Heretofore, it has been customary in the manufacture of small direct current electric motors to construct the field core from a plurality of sheet metal laminations, each lamination having a pair of integral pole formations extending inwardly therefrom. The laminations are assembled in stacked relation and secured together by any suitable means, such as by welding. The pole formations are encircled by field windings, and the field assembly is enclosed by a casing comprising a pair of cup-shaped members having bearings for rotatably supporting an armature. The present invention relates to an improved motor assembly of the two pole type utilizing only a single field coil assembly. Accordingly, among our objects are the provision of a dynamo electric machine including a single piece frame member having a unitary pole assembly for securing the ends of the frame together; the further provision of a commutator type motor including a single piece frame having a portion formed to constitute a pole wherein the ends of the frame are secured in assembled relation by a single pole assembly; the further provision of a rectangular electric motor having a single pole assembly with windings carried thereby including means for supporting a brush holder assembly; and the still further provision of a rectangular electric motor assembly including means for removably securing the commutator end cap to the motor frame.

The aforementioned and other objects are accomplished in the present invention by providing the unitary pole assembly with deformable means for securing the ends of the frame in assembled relation. Specifically, two embodiments of the improved motor assembly are disclosed herein. In the preferred embodiment, the frame comprises a unitary sheet metal member of magnetic material which is formed to provide a substantially rectangular box-like structure having overlapping end portions. The side of the frame opposite the overlapping end portions is of arcuate configuration and constitutes one pole of the motor. The overlapping end portions have aligned apertures, and may also be connected by a pair of false dowels. A pole assembly comprising a pole body and a pole shoe of magnetic material is inserted through the aligned apertures of the folded-over ends and thereafter hot upset to interconnect the overlapping ends of the frame. The pole body is encircled by a field coil which is wound on a spool. A metal brush holder bracket is interposed between the field coil and the frame, the bracket having a pair of inwardly extending flanges to which a brush holder plate is attached. A pole plate of metallic material is welded to the outer periphery of the arcuate portion of the frame constituting a pole so as to improve the magnetic flux distribution in the pole area.

One end of the frame is closed by an end cap that is projection welded thereto. This end cap supports a self-aligning bearing assembly within which one end of the armature shaft is rotatably journalled. The other end of the armature shaft is rotatably journalled in a commutator end cap assembly which is removably secured to the other end of the frame assembly. The commutator end cap assembly is secured to the frame by a pair of L-shaped studs secured to the frame and extending through apertures in the end cap assembly.

In the second embodiment, the frame comprises a unitary sheet metal member of magnetic material having abutting end portions. Each end portion has a longitudinally extending slot or aperture, spaced from the marginal edge thereof. In the second embodiment, the pole assembly comprises a plurality of sheet metal laminae each lamina having an arcuate pole shoe formation, a body formation, a flange, and a pair of upstanding bifurcated lugs. The lugs extend through the slots in the end portions of the frame and are staked thereover to secure the frame in assembled relation. In all other respects, the motor assembly of the second embodiment is identical with that of the preferred embodiment.

Further objects and advantages of the present invention will be apparent from the following description, reference being had to the accompanying drawings, wherein preferred embodiments of the present invention are clearly shown.

In the drawings:

FIGURE 1 is a view in elevation of a motor constructed according to the preferred embodiment of this invention.

FIGURE 2 is a longitudinal sectional view taken along line 2—2 of FIGURE 1.

FIGURE 3 is a sectional view taken along line 3—3 of FIGURE 2.

FIGURE 4 is a sectional view taken along line 4—4 of FIGURE 2 with certain parts removed.

Figure 5:
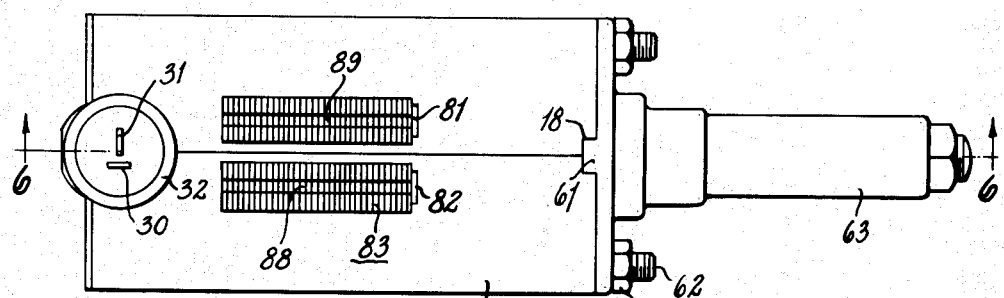
FIGURE 5 is a view in elevation of a motor constructed according to the second embodiment of this invention.

With particular reference to FIGURES 1 through 4, in the preferred embodiment, the motor comprises a steel frame 10, which as shown in FIGURES 2 through 4 is of substantially rectangular configuration having overlapping end portions 11 and 12. The side of the frame 10 opposite the overlapping end portions 11 and 12 is of arcuate configuration as indicated by numeral 13. The radius of the curved portion 13 has its center at the axis of the armature. As seen in FIGURES 2 and 4, the overlapping end portions 11 and 12 have aligned apertures 14 and 15 respectively. If desired, the overlapping end portions 11 and 12 may be connected by false dowels 16 and 17 which are pressed from the portion 11 into apertures of the portion 12. Each end of the frame 10 may have a plurality of locating notches formed therein such as indicated by numeral 18 in FIGURES 1 and 2, the purpose of which will be described hereinafter.

As aforementioned, the motors of this invention are of the two pole type having a single field coil assembly. One pole of the motor is formed by the curved portion 13 of the frame 10, and in order to improve the distribution of magnetic flux at this pole, a pole plate 19 of magnetic material is welded to the outer surface thereof. The frame 10 is also formed with a transversely extending slot 20, the purpose of which will be described hereinafter. The overlapping end portions 11 and 12 of the frame assembly are maintained in assembled relation by a pole assembly 21 comprising a pole body 22 having an integral stud portion 23 extending through the aligned apertures 14 and 15 of the frame. The pole body 22 has a second stud portion 24 extending therefrom to which a pole shoe 25 of curved configuration is attached by hot upsetting the stud 24.

Prior to securing the pole assembly 21 to the frame 10, a field coil assembly 26 is assembled over the pole body. The coil assembly 26 is wound on a spool 27 of insulating material. A metallic bracket 28 having a flanged opening 29 is assembled on top of the coil assembly 26, as shown. Thereafter, the stud 23 is inserted through the openings 14 and 15 of the frame and hot upset to secure the end portions of the frame in assembled relation.

The coil assembly 26 as shown includes two series windings, as used in a split series reversible motor. The lead wires from one end of each series field winding are suitably connected to terminals 30 and 31 supported by a grommet 32 attached to the frame 10. The bracket 28, as seen in FIGURES 2 and 3, is formed with a pair of inwardly extending flanges 33 and 34. The pole plate 19 has an axially extending lug 35 as shown in FIGURE 3 for supporting one end of the brush plate. In addition, each flange portion 33 and 34 of the bracket 28 has a tang 36 and 37, respectively, extending axially outwardly therefrom. The projection 35 and the tangs 36 and 37 are arranged to support a brush holder assembly generally depicted by the numeral 38. Upon energization of either series field winding the pole assembly 31 is magnetized and some of the magnetic flux produced by the energized field winding is distributed circumferentially through the frame to pole 13. A brush holder assembly 38 includes a plate 39 of insulating material having a pair of brush guides 40 and 41 secured thereto. The brush guides support brushes 42 and 43, respectively, having pigtails 44 and 45. In the conventional manner, the brushes 42 and 43 are urged inwardly toward the axis of the armature by springs, not shown. The pigtail 44 is connected to a terminal 46 of a thermal overload switch 47. The other terminal of the thermal overload switch 47 is connected to a wire 48. The thermal overload switch 47 is carried by a bracket attached to the plate 39 of insulating material. The tangs 36 and 37 extend through apertures in the plate 39. Thereafter, the tangs 36 and 37 are twisted as shown to secure the brush holder assembly in position. The projection 35 of the pole plate 19 extends through an aperture in the brush holder plate 39 and receives a sheet metal fastener 50 of conventional design. The other lead wire 51 of one series field winding and the other lead wire 52 of the other series field winding are connected to the brush guide 41. The pigtail 45 is also connected to the brush guide 41.

One end of the frame is closed by an end plate 53 having locating projections, such as indicated by 54, which are received in the notches 18 of the frame 10. The end plate 53 is permanently attached to the frame 10 by any suitable means, such as projection welding. The end plate 53 is formed with an integral depression having a spherical surface 55 for supporting a self-aligning bearing 56. The plate 53 also has attached thereto a slinger shield 57 which supports a resilient bearing retainer 58. A suitable felt packing 59 impregnated with lubricant is interposed between the bearing retainer 58 and the end plate 53.

The commutator end plate comprises a casting 60 having lugs 61 which are received in the notches 18 of the frame 10. The casting 60 is formed with an axially extending tubular extension 63 which supports a sleeve bearing 64. The commutator end plate 60 is attached to the frame 10 by a pair of L-shaped studs 62 which are welded to the frame 10 and extend through apertures in the end plate 60. The bolts 62 receive nuts 65 which removably secure the commutator end plate to the frame.

An armature 66 of conventional construction has a shaft 67 rotatably supported in the spaced bearings 56 and 64. The armature shaft may be formed with an integral worm 68 disposed within the tubular extension 63. The armature includes a commutator 69 which is engaged by the brushes 42 and 43, and the commutator end of the armature shaft 67 engages a thrust bearing 70 adjustably supported in the sleeve extension 63. The thrust bearing 70 is carried by a stud 71 which receives a nut 72. The thrust of the armature 66 in the other direction is sustained by a disc 73 interposed between the other end of the armature shaft and the end plate 53. In a conventional manner, the armature shaft has attached thereto oil slingers 74 and 75. The portion of the brush holder assembly 38 which extends through the slot 20 may be enclosed by a cap 76 having lugs 77 and 78 which may be snapped over the edges of the frame 10 at the ends of the slot 20 as shown in FIGURE 3.

Figure 6:
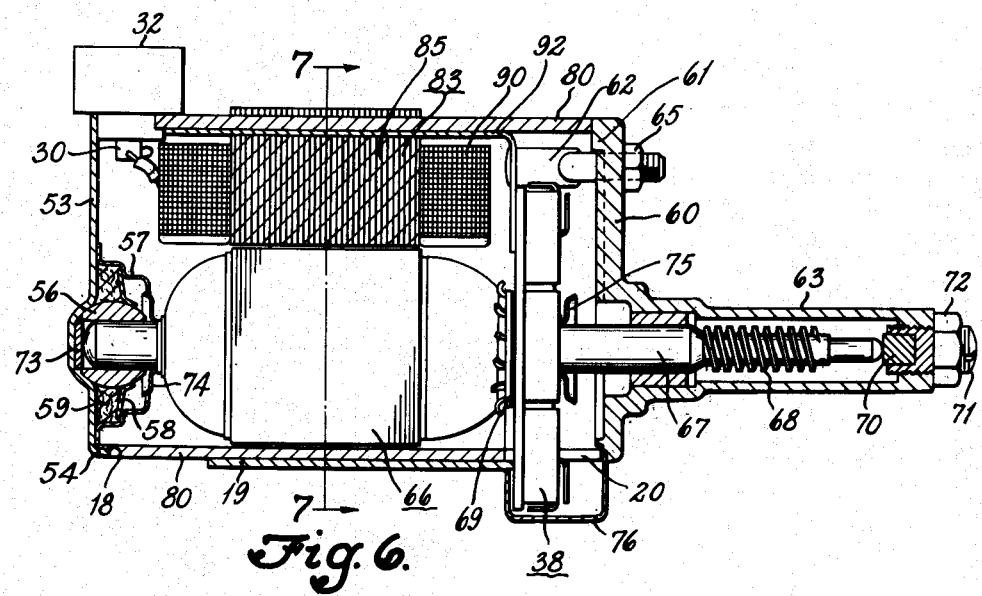
FIGURE 6 is a longitudinal sectional view taken along line 6—6 of FIGURE 5.
Figure 7:
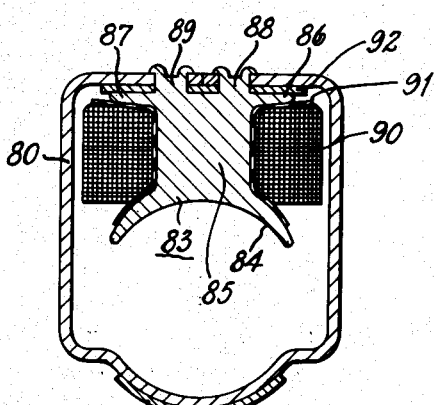
FIGURE 7 is a sectional view taken along line 7—7 of FIGURE 6 with certain parts removed.

With reference to FIGURES 5 through 7, a modified embodiment of a single field coil assembly two pole motor will be described, similar numerals depicting similar parts throughout the several views. In the modified embodiment, the sheet metal frame 80 is of substantially rectangular configuration but instead of having overlapping end portions, the marginal edges of the frame abut each other as shown in FIGURES 5 and 7. Each end portion of the frame 80 has a longitudinally extending slot 81 and 82 formed therein spaced from the marginal edge thereof. In the modified embodiment the pole assembly comprises a plurality of sheet metal laminations 83, which as seen in FIGURE 7, are formed with an arcuate pole shoe formation 84, a body portion 85, a pair of flanges 86 and 87 and a pair of bifurcated lugs 88 and 89. The laminations may be secured in stacked relation by any suitable means, such as by welding, and the field coil windings 90 are wound about the stacked laminations, a suitable liner 91 of insulating material being wrapped about the stacked laminations prior to winding.

Thereafter, a metallic brush holder bracket 92 is placed on top of the flanges 86 and 87 of the field coil assembly and the lugs 88 and 89 are inserted through the slots 81 and 82 of the frame 80. The lugs 88 and 89 are then staked so as to attach the field coil assembly to the frame and secure the ends of the frame assembly in assembled relation. The remaining components of the motor having the laminated pole piece assembly are identical with the components hereinbefore described in connection with FIGURES 1 through 4.

From the foregoing it is apparent that the present invention provides a two pole motor assembly having a single field coil assembly thereby lending itself to the economical manufacture of small direct current motors. In addition, the assembly enables motors to be manufactured having a substantially rectangular configuration so that the motor can be installed and used with assemblies requiring a motor of this type.

While the embodiments of the invention as herein disclosed constitutes preferred forms, it is to be understood that other forms might be adopted, as may come within the scope of the claims which follow.

What is claimed is as follows:

1. In a dynamo electric machine, a single piece sheet metal frame of substantially rectangular cross-section having an arcuate portion constituting a pole, said sheet metal frame having contiguous end portions opposite said pole with longitudinally extending slots spaced from the marginal edges thereof, and a pole piece assembly having lug means extending through said slots and deformed thereover for securing the end portions together.

2. In a dynamo electric machine, a single piece sheet metal frame having a substantially rectangular cross-section with an arcuate portion constituting a pole, said sheet metal frame having overlapping end portions opposite said pole with aligned apertures therein, and a pole piece assembly having a stud extending through said aligned apertures and deformed thereover to interconnect the end portions of said frame.

3. An electric motor assembly including, a single piece sheet metal frame of substantially rectangular cross-section having an arcuate portion constituting a pole, said sheet metal frame having contiguous end portions opposite said pole with apertures therein, a pole piece assembly having lug means extending through said apertures and deformed thereover for connecting the end portions of said frame, a field coil assembly carried by said pole piece assembly, a pair of end caps secured to said frame, an armature assembly rotatably supported in said end caps and having a commutator, a bracket clamped between said pole piece assembly and a brush holder assembly and said frame, carried by said bracket and having brushes engaging said commutator.

4. In an electric motor, a single piece sheet metal frame having a substantially rectangular cross-section with an arcuate portion constituting a pole, said sheet metal frame having contiguous end portions opposite said pole with apertures therein, a pole piece assembly having lug means extending through said apertures and deformed thereover to interconnect the end portions of said frame, a pole plate secured to said frame on the arcuate portion thereof, a pair of end caps attached to said frame, an armature rotatably supported in said end caps, a field coil assembly carried by said pole piece assembly, and a brush holder bracket clamped between said pole piece assembly and said frame.

5. In a dynamo electric machine, a single piece sheet metal frame of substantially rectangular cross-section having an arcuate portion constituting a pole, said sheet metal frame having contiguous end portions opposite said pole with apertures therein, a pole plate secured to the arcuate portion of said frame, and a pole piece assembly having lug means extending through apertures in said frame with the lug means deformed to secure the end portions of the frame together.

6. In a dynamo electric machine, a single piece sheet metal frame having portions formed to constitute a pole, said sheet metal frame having contiguous end portions opposite said pole with apertures therein, a pole piece assembly having lug means extending through said apertures with the lug means being deformed to secure the end portions together, and a brush holder bracket clamped between said pole piece assembly and said frame.

7. An electric motor assembly including, a single piece sheet metal frame of substantially rectangular cross-section having an arcuate portion constituting a pole, said sheet metal frame having contiguous end portions with apertures therein, a pole piece assembly having lug means extending through said apertures with the lug means being deformed to secure said end portions together, a field coil assembly carried by said pole piece assembly, an end cap secured to each end of said frame, an armature assembly rotatably supported in said end caps and having a commutator, a bracket clamped between said pole piece assembly and said frame, and a brush holder assembly carried by said bracket and having brushes engaging said commutator, one of said end caps being removably secured to said frame by a plurality of L-shaped studs attached to said frame and extending through openings in said one end plate, said studs receiving nuts.

8. In a dynamo electric machine, a single piece sheet metal frame having a portion formed to constitute a pole, said sheet metal frame having contiguous end portions opposite said pole with apertures therein, a pole piece assembly having lug means extending through said apertures with the lug means being deformed to secure the end portions together, a bracket clamped between said pole piece assembly and said frame, and a brush holder plate connected to said bracket.

9. An electric motor assembly including, a single piece sheet metal frame of substantially rectangular cross-section having an arcuate portion constituting a pole, a pole plate secured to said arcuate frame portion, said sheet metal frame having contiguous end portions opposite said pole with apertures therein, a pole piece assembly having lug means extending through said apertures with the lug means being deformed thereover, a field coil assembly carried by said pole piece assembly, a pair of end caps secured to said frame, an armature assembly rotatably supported in said end caps and having a commutator, a bracket clamped between said pole piece assembly and said frame having an inwardly extending flanged portion, and a brush holder assembly attached to the inwardly extending flanged portion of said bracket and having brushes engaging said commutator.

10. In a dynamo electric machine, a single piece sheet metal frame of substantially rectangular cross-section having an arcuate portion constituting a pole, said frame having contiguous end portions located opposite said arcuate portion, and a pole piece assembly secured to the contiguous end portions of said frame.

References Cited in the file of this patent

UNITED STATES PATENTS

| | | |
|---|---|---|
| 508,633 | Priest | Nov. 14, 1893 |
| 560,610 | Davidson | May 19, 1896 |
| 875,263 | Hertwig | Dec. 31, 1907 |
| 2,763,800 | Curley | Sept. 18, 1956 |
| 2,780,744 | Carneck | Feb. 5, 1957 |

FOREIGN PATENTS

| | | |
|---|---|---|
| 432,786 | Great Britain | Aug. 1, 1935 |
| 534,319 | Germany | Sept. 24, 1931 |
| 584,182 | France | Nov. 14, 1924 |
| 603,604 | Germany | Oct. 6, 1934 |
| 746,360 | Germany | July 21, 1944 |